Figure 1:
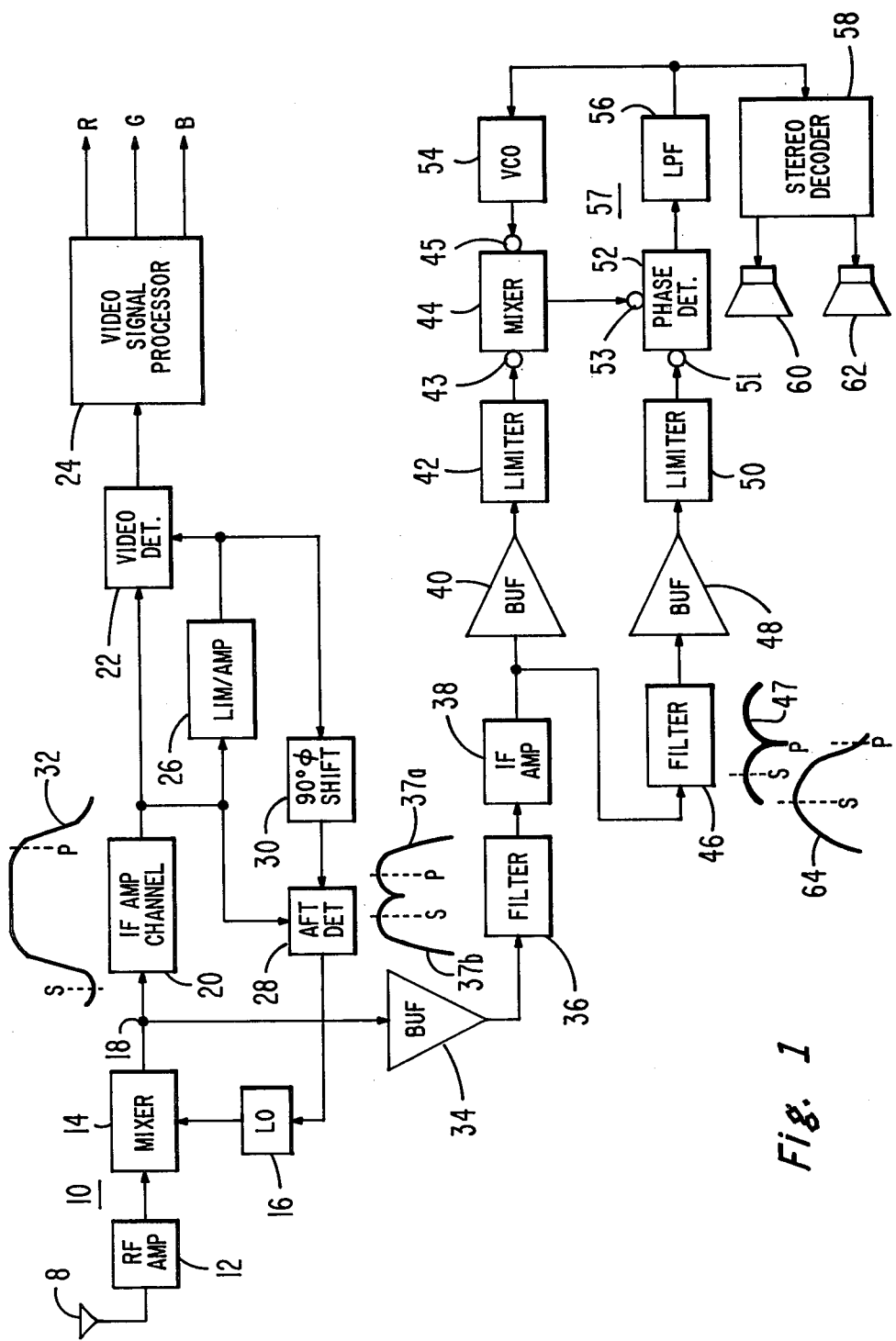

United States Patent [19]

Griffis

[11] Patent Number: 4,470,070
[45] Date of Patent: Sep. 4, 1984

[54] FREQUENCY TRANSLATION PHASE-LOCKED LOOP TELEVISION SOUND DETECTION SYSTEM

[75] Inventor: Patrick D. Griffis, Indianapolis, Ind.

[73] Assignee: RCA Corporation, New York, N.Y.

[21] Appl. No.: 412,898

[22] Filed: Aug. 30, 1982

[51] Int. Cl.³ .............................................. H04N 5/62
[52] U.S. Cl. .................................... 358/198; 358/197
[58] Field of Search ..................... 358/189, 195.1, 196, 358/197, 198, 143, 144; 455/175, 182, 184, 265

[56] References Cited

U.S. PATENT DOCUMENTS 4,419,695  12/1983  Yamamoto .......................... 358/197

FOREIGN PATENT DOCUMENTS

| 2843977 | 4/1980 | Fed. Rep. of Germany ...... 358/198 |
| 55-134586 | 10/1980 | Japan .................................. 358/198 |
| 56-93490 | 7/1981 | Japan .................................. 358/197 |
| 57-58475 | 4/1982 | Japan .................................. 358/198 |
| 57-68977 | 4/1982 | Japan .................................. 358/197 |

OTHER PUBLICATIONS

"Intercarrier Buzz Phenomena Analysis and Cures" by P. Fockens and C. G. Ellers, Published in *IEEE Transactions on Consumer Electronics*, Aug. 1981, pp. 381-397.

Phaselock Techniques by Floyd M. Gardner, Published by John Wiley and Sons, Inc. 1966, Chapter 8-4.

*Primary Examiner*—Tommy P. Chin
*Attorney, Agent, or Firm*—Eugene M. Whitacre; Peter M. Emanuel; Lawrence C. Edelman

[57] ABSTRACT

A frequency translation phase-locked loop (PLL) is provided for detecting the audio information from a television signal. The PLL includes a mixer and a phase detector, responsive to the intermediate picture and sound carriers respectively, which carriers are amplified by a single IF amplifier. A first filter is coupled between the output of the television receiver tuner and the input of the IF amplifier and has a frequency response for passing the picture and sound carriers. The input of the mixer is coupled to the output of the IF amplifier and is substantially responsive to the amplified picture carrier. The phase detector has a first input also coupled to the output of the IF amplifier and is substantially responsive to the amplified sound carrier and a second input coupled to the output of the mixer. A second filter coupled to one of the first and second inputs of the phase detector has an amplitude versus frequency response which provides a predetermined attenuation at the frequency of the picture carrier and substantially less attenuation at the frequency of the sound carrier. A lowpass filter coupled to the output of the phase detector provides the detected audio information.

8 Claims, 2 Drawing Figures

FREQUENCY TRANSLATION PHASE-LOCKED LOOP TELEVISION SOUND DETECTION SYSTEM

The present invention relates to television sound signal processing and, in particular, to a frequency translation phase-locked loop (PLL) for detecting the audio information.

Multichannel audio for stereo and bi-lingual broadcasting involves the use of one or more audio subcarriers, which subcarriers increase the television audio signal bandwidth for 15 kHz to approximately 90 kHz or more. As a result, an audio buzz which is produced in the sound signal processing channel of a multichannel audio television receiver tends to be more severe than in the sound signal processing channel of a single channel audio television receiver.

Audio buzz, which may be defined as the result of a picture-related modulation which is transferred to the audio signal, has always been present to some degree in television signal processing circuitry but, has been kept within tolerable limits in a monophonic audio channel due to its relative narrow bandwidth. However, with the wider frequency bandwidth required for multichannel audio, conventional circuits do not keep the audio buzz within acceptable limits.

An audio detection system for processing television signals including a multichannel audio signal in which the audio buzz is reduced to within acceptable levels is described in U.S. patent application Ser. No. 412,902 entitled, "Television Sound Detection System Using A Frequency Translation Phase-Locked Loop" filed concurrently with the present application in the name of Abraham E. Rindal and assigned, like the present application, to RCA Corporation. In that system the IF picture carrier provided at the output of the tuner is processed in a separate IF channel for developing the video information. Audio information is detected by a frequency translation phase-locked loop (PLL) including a mixer and a phase detector responsive to the IF picture and sound carriers, respectively, provided at the output of the tuner. More specifically, a picture bandpass filter selects the picture carrier from the output of the tuner and applies it to an input of the mixer via a first IF amplifier. A sound bandpass filter also coupled to the output of the tuner selects the sound carrier and applies it to an input of the phase detector via a second IF amplifier. Since the picture and sound carriers are separately processed to generate the video and audio information, picture-related audio buzz is significantly reduced. Furthermore, since the frequency translation PLL uses the picture carrier signal for demodulating the sound carrier, any common mode frequency modulation of the picture and sound carriers is cancelled. However, in the above-described system, two separate IF amplifiers are required. This tends to increase the complexity of the sound detection system and thus its cost.

In accordance with the principles of the present invention a single IF amplifier provides amplification for the IF picture and sound carriers before application to the inputs of the PLL. A first filter coupled between the output of the tuner and the input of the IF amplifier has a frequency response for selecting and passing the picture and sound carriers relatively unattenuated to the IF amplifier. The input of the mixer of the frequency translation PLL is coupled to the output of the IF amplifier and is responsive to the amplified picture carrier. The first input of the phase detector is also coupled to the output of the IF amplifier and is responsive to the amplified sound carrier. A second filter coupled one of the inputs of the phase detector has a frequency response for selecting and passing substantially only the frequency of the sound carrier to the phase detector.

Figure 2:
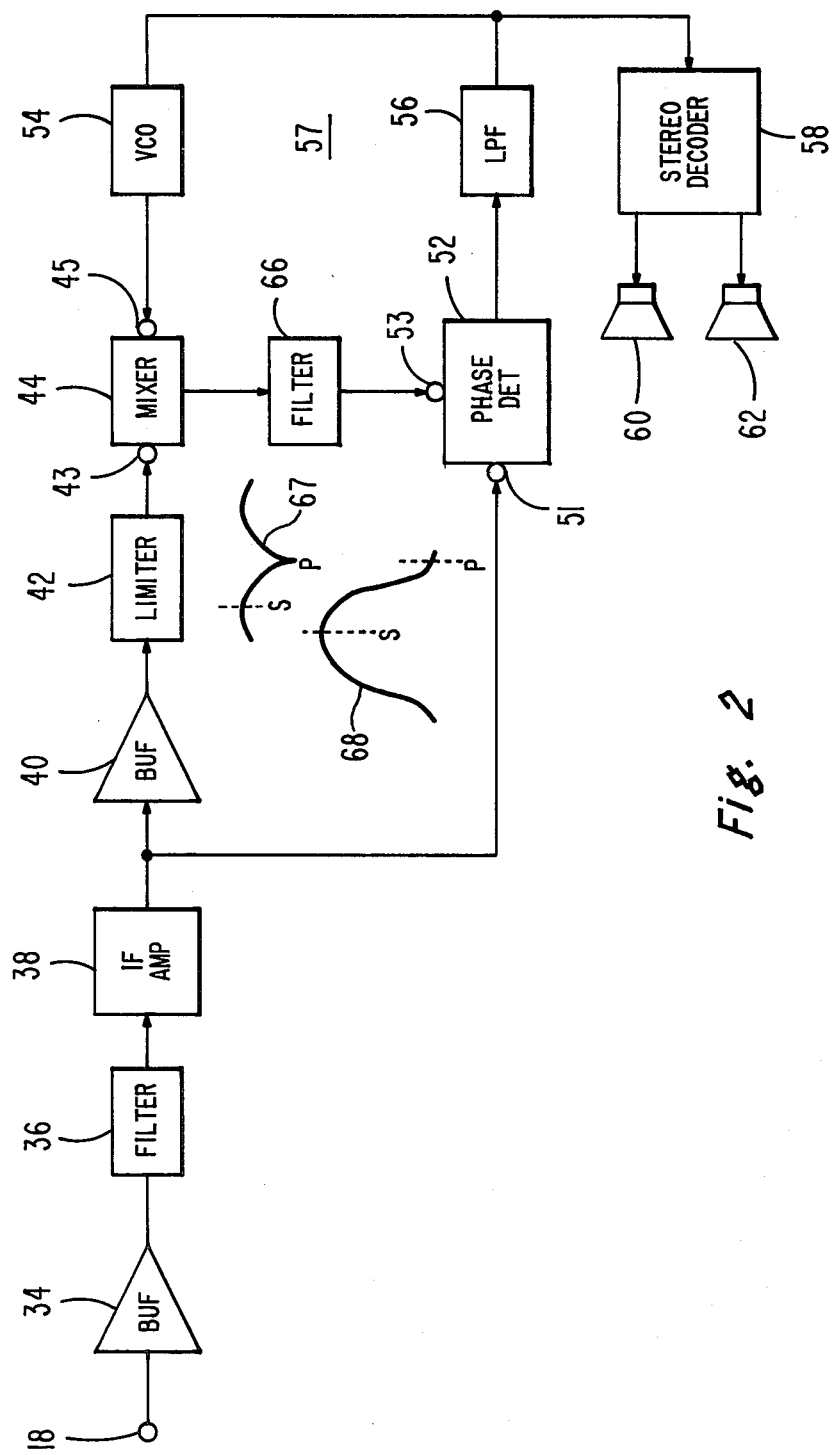

In the drawing:

FIG. 1 shows in block diagram form a television receiver including a frequency translation PLL sound detection system constructed in accordance with the principles of the invention; and FIG. 2 shows in block diagram form an alternative embodiment of a frequency translation PLL sound detection system for the television receiver of FIG. 1, also constructed in accordance with the principles of the invention.

Referring to FIG. 1, a television broadcast signal received by an antenna 8 is applied to a television tuner 10 which includes a radio frequency (RF) amplifier 12, a mixer 14 and a local oscillator 16. Tuner 10 selectively translates the RF picture and sound carrier signals of a selected TV channel to intermediate frequency (IF) carriers at, e.g., 45.75 MHz and 41.25 MHz, respectively, in the NTCS system. The IF carriers are available at tuner output terminal 18. The 45.75 MHz IF picture carrier is basically an amplitude modulated (AM) signal containing the composite video information. The 41.25 MHz IF sound carrier, on the other hand, is a frequency modulated (FM) signal. Conventional color television signal processing circuitry including an IF filtering and amplifying channel 20, a video detector 22 and a video signal processor 24 are responsive to the IF picture carrier at terminal 18 for providing the red (R), green (G), and blue (B) color video signals to a kinescope (not shown) for reproducing a color image of a televised scene. Additionally, a tuned limiter/amplifier stage 26 provides an appropriately filtered, amplified and limited version of the IF picture carrier signal to video detector 22 for the synchronous detection of the composite video signal from the IF picture carrier. The IF picture carrier output of limiter/amplifier 26 is also applied to a first input of an automatic fine tuning (AFT) detector 28 via a 90° phase shifting network 30. The unlimited IF signal output of IF channel 20 is applied to a second input if AFT detector 28. AFT detector 28 provides an AFT control signal which is applied to local oscillator 16. In this manner the frequency and phase of the local oscillator signal applied to mixer 14 tracks the frequency and phase of the received RF picture carrier. The construction and operation of video detector 22, limiter/amplifier 26, AFT detector 28 and phase shifting network 30 is described in greater detail in U.S. Pat. No. 4,263,611 issued Apr. 21, 1981 in the name of W. G. Gibson, et al.

IF channel 20 has a conventional passband response 32 in which the IF picture carrier P is located 6 db down on the higher frequency slope of passband response 32 and the IF sound carrier S is located approximately 25 db down on the lower frequency slope of passband response 32. Thus, the vestigial sideband video information can be detected without significant interference from the IF sound carrier. Unfortunately, IF passband response 32 induces what is called a "Nyquist" incidental carrier phase modulation (ICPM) to the IF picture carrier, due to its asymmetrical attenuation of the sidebands of the IF picture carrier. In the conventional intercarrier type of sound detection system this Nyquist induced ICPM distortion of the IF picture carrier results in distortion of the intercarrier sound signal due to the process of mixing the IF sound and picture carriers. This distortion of the intercarrier sound signal results in audio buzz. The amount of audio buzz caused by Nyquist ICPM increases in direct relationship with increases in the bandwidth of the audio signal. Thus, when one considers that the bandwidth of a composite audio signal including multiple subcarriers for the transmission of, for example, monophonic, stereophonic and second audio program signals is significantly greater than the bandwidth of the monophonic signal conventionally processed by an intercarrier system, it becomes apparent that the conventional intercarrier type of audio detection is likely to be unsatisfactory since the audio buzz produced will be substantially increased.

In the present sound detection system, the IF sound carrier is processed in a path separate from the IF picture carrier processing circuitry and the composite audio signal is detected by a frequency translation phase-locked loop (PLL) 57 of FIG. 1. In accordance with the present invention, appropriate amplification of the IF picture and sound carriers suitable for application to PLL 57 is provided by a common IF amplifier. Specifically, the IF picture and sound carriers provided at terminal 18 are applied via a buffer amplifier 34 and filter 36 to a single IF amplifier 38. Filter 36 has a double-humped (two peaks) bandpass frequency response including a substantially symmetrical and relatively narrow (e.g., a 3 db bandwidth of 1 MHz) passband portion 37a centered at the IF picture carrier frequency P and a substantially symmetrical and relatively narrow (e.g., a 3 db bandwidth of 1 MHz) passband portion 37b centered at the IF sound carrier frequency for selecting and passing, relatively unattenuated, the picture and sound carriers to IF amplifier 38. Filter 36 maintains the relative magnitudes of the picture and sound carriers and can comprise a conventionally designed discrete element tuned circuit or a surface acoustic wave filter such as the F1322 manufactured by Tokyo Shibaura Electric Co., Ltd. IF amplifier 38 linearly amplifies the picture and sound carrier and includes automatic gain control circuitry for controlling the gain of amplifier 38 so as to establish its output signals at predetermined levels.

From the output of IF amplifier 38, a buffer amplifier 40 and limiter 42 apply an amplitude limited and therefore substantially unmodulated picture carrier to an input terminal 43 of mixer 44. A filter 46, a buffer amplifier 48 and a limiter 50 apply substantially only the IF sound carrier to an input terminal 51 of a phase detector 52. Limiters 42 and 50 may simply comprise parallel connected, oppositely poled, Schottky-barrier diodes. Filter 46 may comprise a discrete element trap circuit having a center frequency tuned to provide a frequency response 47 having maximum attenuation at the IF picture carrier frequency P and minimum attenuation at the sound carrier frequency S.

A varactor tuned voltage controlled oscillator (VCO) 54 having a nominal oscillation frequency equal to the frequency difference, e.g., 4.5 MHz for the NTSC system, between the IF picture and sound carrier, provides a second input signal to mixer 44 at terminal 45. Mixer 44 may comprise for example a double balanced analog multiplifer circuit, such as the MC1496 available from Motorola Semiconductor Products, Inc., operating in a switching mode in response to the amplitude limited IF picture carrier from limiter 42 (which acts as the switching control signal). Mixer 44 mixes the IF picture carrier signal and VCO output signal to provide at its output a frequency translated signal representing the frequency and phase difference between its input signals. The frequency difference between the input signals of mixer 44 is 41.25 MHz. This 41.25 MHz output signal of mixer 44 is supplied to a second input terminal 53 of phase detector 52, which can also comprise an MC1496 integrated circuit. Phase detector 52 provides an output signal having an amplitude which varies in direct relation with the phase difference of its input signals and thus operates as a frequency modulation (FM) demodulator for the applied FM modulated IF sound carrier and provides at its output a composite baseband audio signal (along with undesired signals which result from the detection process). For a more detailed discussion of the operation of analog multipliers as FM demodulators see an article entitled "Applications of a Monolithic Analog Multiplier" by A. Bilotti, in *IEEE Journal of Solid State Circuits*, December 1968, pages 373-380.

A low pass filter 56 coupled to the output of phase detector 52 filters the output signal of phase detector 52 to provide a control signal for controlling the frequency of VCO 54. Mixer 44, phase detector 52, VCO 54 and lowpass filter 56 comprise frequency translation phase-locked loop 57. Lowpass filter 56 has a sufficient bandwidth for selecting the composite baseband audio signal (while rejecting the higher frequency undesired signals) and supplying the composite audio signal, for example, to a stereo decoder 58. If stereo programing is provided in the composite audio signal, decoder 58 will decode the composite audio signal and provide left and right stereo signals to speakers 60 and 62, respectively. If stereo programming is not provided, decoder 58 will provide the monophonic signal to the speakers.

In operation, limiter 42 responds to the highest amplitude signal applied at its input. In television broadcast and cable television distribution systems the transmitted sound carrier is attenuated at least 8 db with respect to the amplitude of the picture carrier. Since filter 36 maintains their relative magnitudes, limiter 42 acts to select substantially only the picture carrier from the output of amplifier 38 and applies it substantially unmodulated to mixer 44. Alternatively, a bandpass filter or a trap type filter circuit could be used in place of limiter 42, however these would not be able to be incorporated into an integrated circuit chip as readily as, for example, a diode limiter circuit and would not remove the amplitude modulated video information.

As previously noted, mixer 44 frequency translates the IF picture carrier applied at its input and provides an output signal having a frequency corresponding to the difference of the frequencies of its input signals (e.g., 41.25 MHz) to input terminal 53 of phase detector 52. Undesired output signals corresponding to feedthrough of the input signals and the sum of the frequency of the input signals are also provided at the output of mixer 44, however these signals are prevented from reaching decoder 58 by the relatively narrow bandwidth of lowpass filter 56.

Filter 46 provides attenuation of the picture carrier relative to the sound carrier, and limiter 50 responds to the greater amplitude sound carrier and applies substantially only the sound carrier to input terminal 51 of phase detector 52. The amplitude of the output voltage of phase detector 52 is a measure of the phase difference between its input signals. This output voltage is filtered and applied by lowpass filter 56 as a control voltage to VCO 54. The output frequency of VCO 54, and consequently the 41.25 MHz translated signal from mixer 44, changes in direct relation to the amplitude of the control voltage and is in a direction for reducing the phase difference between the signals at the inputs of phase detector 52. When the phase of the input signals of detector 52 are in quadrature (90°), minimum amplitude control voltage is applied to VCO 54. Due to the feedback nature of loop 57, when it is locked, the control voltage at the output of lowpass filter 56 corresponds to the audio information, and is such that the frequency of the translated difference signal at the output of mixer 44 is equal to the average frequency of the IF sound carrier and its phase is in quadrature to the phase of the IF sound carrier. Thus, phase detector 52 acts as an FM detector for frequency demodulating the IF sound carrier.

Any common mode FM which may be imparted to both the picture and sound carriers by, e.g., the tuner local oscillator 16 or television accessories such as a cable television converter which may precede tuner 10, is transferred to the translated difference signal and therefore cancelled in phase detector 52.

The present sound detection system is advantageous because use is made of the predetermined frequency spacing between the IF picture and sound carriers for allowing simplification of the receiver tuning and cancellation of any common mode FM of the IF carriers. Furthermore, Nyquist ICPM introduced to the picture carrier due to the upper slope of the IF passband response, produced by a conventional intercarrier type of detection system, does not produce audio buzz in the present detection system. More specifically, the picture and sound processing channels are separated immediately after tuner 10. In the soundprocessing channel, filter response 37a symmetrically attenuates the sidebands of the IF picture carrier and therefore eliminates the "Nyquist" type of audio buzz. Furthermore, filter response 37a is narrowband enough to substantially attenuate components of the video signal which are at frequencies corresponding to second and third subharmonics of 4.5 MHz (e.g., 2.25 MHz and 1.5 MHz, respectively, from the 45.75 MHz If picture carrier in the NTSC system). Since the frequency of the output signal of VCO 50 is also at 4.5 MHz, audio frequency zero beats are prevented from being generated at the output of mixer 44. Consequently, a further source of picture-related audio buzz which is inherent in the intercarrier detection system is substantially eliminated.

Additionally, by comparison with the intercarrier system in which the IF channel passband imparts approximately 25 db of attenuation to the IF sound carrier (which adversely effects the signal-to-noise ratio in the audio channel) in the present detection system, filter response portion 37b provides the IF sound carrier to IF amplifier 38 relatively unattenuated. Thus, the amplitude level of the sound carrier is approximately 25 db greater than in the conventional intercarrier system and the signal-to-noise level of the detected audio signal is accordingly improved for a given RF signal level.

Additionally, it should be noted that since an intercarrier sound signal is not generated, there is no need for an intercarrier amplifier, an intercarrier discriminator or their associated tuned circuits. Furthermore, since a single IF amplifier is used to provide suitably amplified picture and sound carrier signals to the frequency translation PLL 57, the circuit complexity and hence cost is also reduced as compared to the previously noted U.S. patent application filed in the name of Abraham E. Rindal.

It should be noted that the amplitude levels of the input signal to mixer 44 and phase detector 48 are such that their input devices are primarily responsive to the frequency and phase of the input signals and not their amplitudes. Thus, an inherent AM rejection of the IF picture carrier modulation is obtained. Furthermore, although a sum frequency signal (i.e., 82.5 MHz) is also provided at the output of phase detector 52, its modulation envelope is substantially symmetrical and thus has an insignificant effect at the audio baseband frequencies. Therefore, the limiting action of limiter 42 need not be as great as that required in an intercarrier system. This lesser degree of limiting further reduces; (1) the possibility of picture-related line and field rate audio buzz caused by a high degree of modulation of the IF picture carrier, and (2) the generation of harmonics, which can mix with the output of VCO 54 and generate distortion in the audio frequency band.

The above-described sound detection system from IF amplifier 38 through decoder 58 (excluding filter 46) can advantageously be constructed on a single integrated circuit. Limiters 42 and 50 can comprise diode circuits. Filters 36 and 46 can be constructed using relatively inexpensive tuned circuits since the amount of attenuation which they must provide is relaxed.

In an alternative embodiment, limter 50 can be eliminated, however, in order to compensate for the additional signal rejection which was previously provided by limiter 50, filter 46 would have to provide a corresponding increase of attenuation at the picture carrier frequency P. This can be easily accomplished by adjusting its tuned circuit components. Furthermore, filter 46 can be constructed as a relatively narrow (e.g., 500 kHz) bandpass filter having a frequency response 64 centered at the sound carrier frequency S and providing substantial attenuation at the picture carrier frequency P.

The above-described alternative embodiments describe various techniques for attenuating the picture carrier and preventing it from reaching input terminal 51 of phase detector 52. If the picture carrier is not appropriately attenuated at input terminal 51, the feedthrough of the picture carrier from the output of mixer 44 to input terminal 53 of detector 52 will mix with the picture carrier at input 51 and provide a zero beat output signal which would be within the audio frequency range and thus distort the audio information.

In FIG. 2 an alternative embodiment of the sound detection system of the television receiver of FIG. 1 is shown. Elements having the same construction and operation have similar numbers to corresponding elements of FIG. 1. A filter 66 is provided between the output of mixer 44 and input terminal 53 of phase detector 52 for substantially attenuating the picture carrier and passing the sound carrier. Thus, means for substantially providing the sound carrier to input terminal 51 of phase detector 52, such as filter 46 and/or limiter 50, are not required. Filter 66 can be of the trap circuit type having a frequency response 67 providing maximum signal rejection at the picture carrier frequency P and minimum attenuation at the sound carrier frequency S. Alternatively, filter 66 can be of the bandpass type having a relatively narrow (e.g., 500 kHz passband frequency response 68 with a center frequency at the sound carrier frequency S and providing substantial attenuation at the picture carrier frequency P.

Finally, it should be clear that the NTSC frequencies mentioned herein are merely illustrative and can be appropriately scaled for operation at other frequencies in the NTSC, PAL or SECAM television systems.

What is claimed is:

1. In a television receiver including a source of intermediate frequency (IF) signal including picture and sound carriers modulated with video and audio information, respectively, apparatus for detecting said audio information comprising:

a first filter having an input coupled to receive said IF signal and having a double-humped amplitude versus frequency response characteristic with peak amplitude portions centered at the frequency of said picture and sound carriers, respectively, for providing at its output said picture and sound carriers;

an amplifier having an input coupled to the output of said first filter for amplifying said picture and sound carriers and providing said amplified carriers at the output of said amplifier;

a controllable oscillator responsive to a control signal coupled to a control input and having an output at which is provided a controlled frequency output signal;

mixer means having a first input coupled to be responsive to said amplified picture carrier, a second input coupled to be responsive to said oscillator output signal and an output for providing a frequency translated signal;

a phase detector having a first input coupled to be responsive to said amplified sound carrier, a second input coupled to be responsive to said frequency translated signal and an output;

lowpass filter means having an input coupled to the output of said phase detector and having an output for providing said control signal to the control input of said controllable oscillator and for providing said audio information; and a second filter coupled to one of said first and second inputs of said phase detector, said second filter having an amplitude versus frequency response characteristic for providing a predetermined attenuation at the frequency of said picture carrier and substantially less than said predetermined attenuation at the frequency of said sound carrier.

2. Apparatus in accordance with claim 1 wherein said second filter is coupled between the output of said amplifier and said first input of said phase detector.

3. Apparatus in accordance with claim 1 wherein said second filter is coupled between the output of said mixer and said second input of said phase detector.

4. Apparatus in accordance with claim 1, 2, or 3 further including a selection means coupled between the output of said amplifier and the input of said mixer for substantially providing at its output said picture carrier.

5. Apparatus in accordance with claim 4 wherein said selection means comprises a diode limiter circuit for providing a substantially unmodulated picture carrier to the input of said mixer.

6. Apparatus in accordance with claim 2 further including a first selection means coupled between the output of said second filter and said first input of said phase detector, said selection means providing additional attenuation of said picture carrier thereby permitting said filter to provide less than said predetermined attenuation at the frequency of said picture carrier.

7. Apparatus in accordance with claim 6 further including a second selection means coupled between the output of said amplifier and the input of said mixer for substantially providing to said mixer only said picture carrier.

8. Apparatus in accordance with claim 7 wherein said first and second selection means comprise diode limiters.

* * * * *

UNITED STATES PATENT AND TRADEMARK OFFICE
CERTIFICATE OF CORRECTION

PATENT NO. : 4,470,070
DATED : 9/4/84
INVENTOR(S) : Patrick Douglas Griffis

It is certified that error appears in the above-identified patent and that said Letters Patent is hereby corrected as shown below:

IN THE TITLE: "FREQUENCY TRANSLATION PHASE-LOCKED LOOP TELEVISION SOUND DETECTION SYSTEM" should be -- FREQUENCY TRANSLATION PHASE-LOCKED LOOP TELEVISION SOUND DETECTION SYSTEM --.

Column 2, line 25 "NTCS" should be --NTSC--.

Column 2, line 46 "if" should be --of--.

Column 6, line 6 "signal" should be --signals--.

Signed and Sealed this

Sixteenth Day of April 1985

[SEAL]

Attest:

DONALD J. QUIGG

Attesting Officer     Acting Commissioner of Patents and Trademarks